United States Patent [19]

Mühle

[11] Patent Number: 4,697,337

[45] Date of Patent: Oct. 6, 1987

[54] METHOD FOR MANUFACTURING THERMO-INSULATED COMPOUND PROFILES FOR WINDOWS, DOORS AND FACADES

[76] Inventor: Manfred Mühle, D-4972 Löhne 2, Fed. Rep. of Germany

[21] Appl. No.: 913,015

[22] Filed: Sep. 29, 1986

Related U.S. Application Data

[62] Division of Ser. No. 662,294, filed as PCT DE84/00019, Jan. 25, 1984, published as WO84/02862, Aug. 2, 1984, Pat. No. 4,646,416.

[30] Foreign Application Priority Data

Jan. 31, 1983 [DE] Fed. Rep. of Germany ....... 3303094
Jan. 25, 1984 [WO] PCT Int'l Appl. .................. PCT/DE84/00019

[51] Int. Cl.[4] .......................... B23P 19/00; S21D 39/00

[52] U.S. Cl. .......................................... 29/796; 29/791; 29/509

[58] Field of Search .................. 29/509, 155 R, 243.5, 29/241, 243.57, 791, 795, 796; 52/403

[56] References Cited

U.S. PATENT DOCUMENTS

| | | | |
|---|---|---|---|
| 3,606,658 | 9/1971 | McConnell | 29/155 R |
| 4,194,284 | 3/1980 | Diels et al. | 29/509 |
| 4,213,236 | 7/1980 | Diels et al. | 29/433 |
| 4,245,384 | 1/1981 | Egerer | 29/433 |

FOREIGN PATENT DOCUMENTS 3025706 1/1982 Fed. Rep. of Germany .

*Primary Examiner*—Howard N. Goldberg
*Assistant Examiner*—Steven Nichols
*Attorney, Agent, or Firm*—Max Fogiel

[57] ABSTRACT

The invention relates to a apparatus for manufacturing thermo-insulated compound profiles for windows, doors and facades, wherein two metal profiles to be joined to form a compound profile are provided with longitudinal grooves into which connecting webs forming an insulating chamber together with the metal profiles are inserted, and secured at their base portions, engaging in the longitudinal grooves, by means of the deformation of the retaining strips bounding the longitudinal grooves.

5 Claims, 5 Drawing Figures

METHOD FOR MANUFACTURING THERMO-INSULATED COMPOUND PROFILES FOR WINDOWS, DOORS AND FACADES

This is a division of application Ser. No. 662,294 filed Sept. 21, 1984 now U.S. Pat. No. 4,646,416.

The invention relates to a method for manufacturing thermo-insulated compound profiles for windows, doors and facades, wherein two metal profiles to be joined to form a compound profile are provided with longitudinal grooves into which connecting webs forming an insulating chamber together with the metal profiles are inserted, and secured at their base portions, engaging in the longitudinal grooves, by means of the deformation of the retaining strips bounding the longitudinal grooves.

Numerous methods of this type are known, especially from the printed matters German Auslegeschrift No. 2,559,599, German Auslegeschrift No. 2, 604, 670 and German Pat. No. 2,755,669. Both the German Auslegeschrift No. 2,559,599 and the German Auslegeschrift No. 2, 604, 670 make provision for a forming tool to be moved through between the insulating connecting webs in the profiled inside chamber formed by the connecting webs together with the metal profiles, the forming tool being intended to press the four retaining strips of the metal profiles pointing towards the profiled inside chamber simultaneously against the connecting webs. However, this results in obvious difficulties in compensating production tolerancies of the parts to be joined together, which in turn can result in the forming tool not applying the same pressure to all retaining strips, and consequently the compound profile does not receive adequate shear strength.

Whereas the German Auslegeschrift No. 2, 604, 670 does not take into account the above aspect, according to the German Auslegeschrift No. 2, 559, 599 the drawing mandrel used there for tolerance compensation is to be split in the longitudinal direction or equipped with fork-like legs, so that these mandrel parts can each be pressed individually under spring force. Apart from the costly construction of the drawing mandrel resulting from this, which in practice is scarcely possible to realise for compound profiles with small inside chambers, it still appears that no satisfactory production properties can be achieved by this, because in the German Pat. No. 2, 552, 700 originating in a divisional Application to the German Auslegeschrift No. 2, 559, 599 further expensive measures for improving such a type of compound profile have been claimed.

Although the method according to the German Pat. No. 2, 755, 699, also listed as prior art, is no longer encumbered with previously mentioned defects, it is not nearly suitable for every type of profile section to be met with; this especially applies when there are undercuts in the metal profiles. Th this extent its application possibilities are severely limited, which in turn represents a quite considerable disadvantage.

The object of the invention is to develop a method for manufacturing thermo-insulated compound profiles, which, despite unavoidable production tolerancies of the metal profiles and connecting webs, ensures absolute dimensional accuracy and uniform strength properties of the compound profiles manufactured in the manner according to the invention. In this connection, it is not only to be suitable for every profile section to be met with, but also for all profile sizes, in order to make it possible to retain already existing profile series and in order not to prevent the development of new profile forms. A further object of the invention is to create a device suitable for implementing the desired method, this device facilitating a continuous production sequence which is arranged for large quantities and is therefore cost effective. The measures proposed with this invention for achieving the set objects follow from the patent claims.

The combined pressing, selected for the first time by this invention, over the inner and outer retaining strips with the base portions of the connecting webs inserted in the longitudinal grooves of the metal profiles provides the pre-condition for making it possible to manufacture each compound profile form without difficulty and completely unimpaired in strength by dimensional deviations of the parts to be joined together. Consequently this new type of method is clearly superior to all previously known manufacturing methods by on the one hand avoiding their disadvantages and on the other hand by combining their respective advantages.

Illustrated embodiments of the invention are shown in the drawings, wherein in detail:

Figure 1:
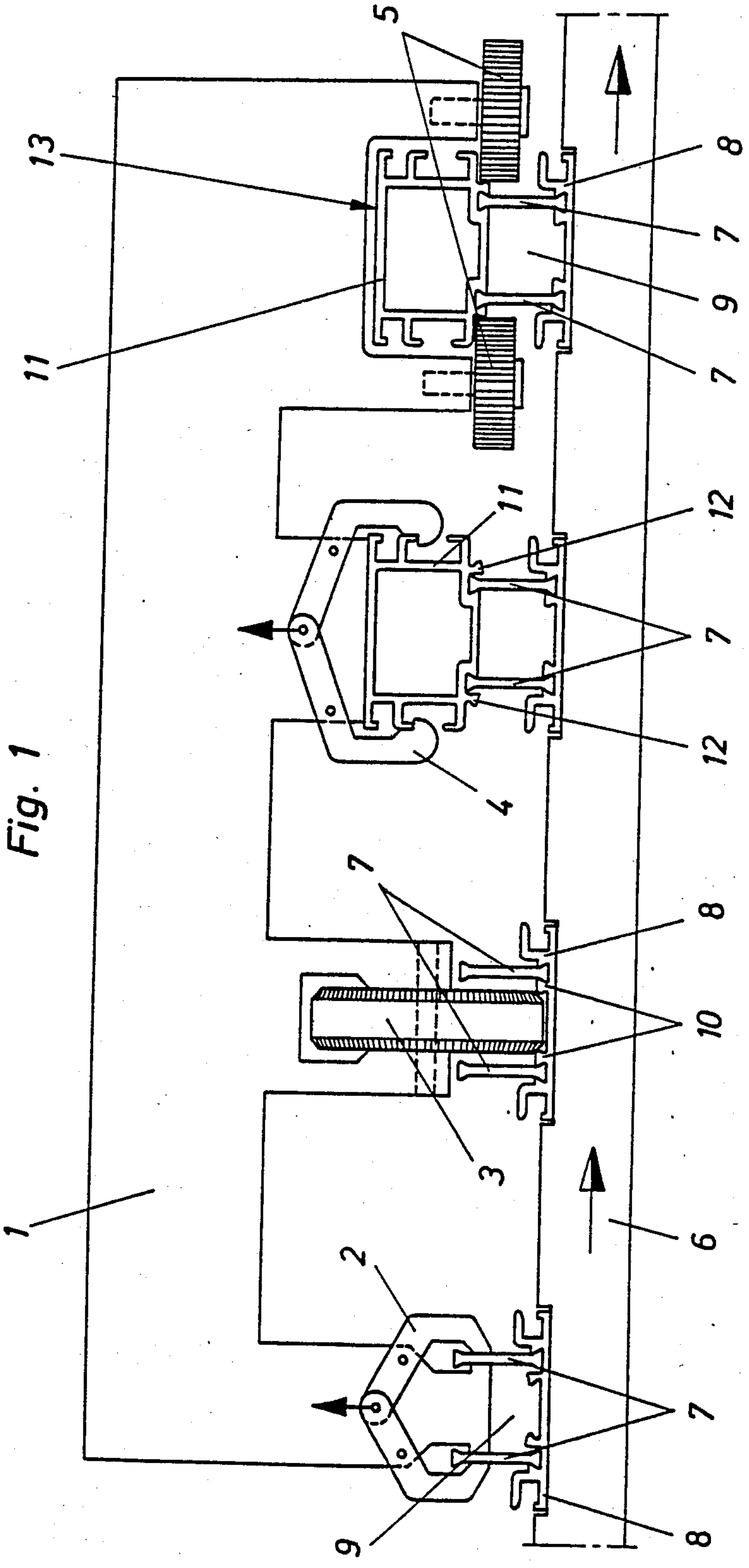
FIG. 1 shows a schematic representation of a production device combining the process steps according to the invention.

The production device schematically shown in FIG. 1 for manufacturing thermo-insulated compound profiles comprises as a main component a production head 1, by means of which all process steps of the invention can be combined in a single process operation. For this purpose, it is provided with a double clamp 2, a vertically located forming roller 3, a gripping clamp 4 and a horizontally located forming roller pair 5, which are located next to one another in the sequence of the process steps over a transport means 6 moving cyclically after every process step in a transverse direction to the production head 1.

According to the first process step to be performed, the double clamp 2 is used to draw in two connecting webs 7 into the corresponding longitudinal grooves of a first metal profile 8, which is fed on the transport means 6. Accordingly, this first metal profile 8, now provided with the connecting webs 7 subsequently forming the insulating chamber 9, moves in the direction of the arrow to the next production station. There, the vertically located forming roller 3 engages between the two connecting webs 7 and at the same time presses the inner retaining strips 10 of the metal profile 8, by which means the base portions of the connecting webs 7 are secured in the longitudinal grooves. In the third production station, the gripping clamp 4 then slips a second metal profile 11 lid-like onto the connecting web 7, and in the fourth production station, the outer retaining strips 12 of the second metal profile 11 are pushed against the base portions, not yet secured, of the connecting webs 7 by forming rollers 5 located opposite one another in pairs. Consequently, the two metal profiles 8 and 11 and the connecting webs 7 are then joined to form the thermo-insulated compound profile 13 with the insulating chamber 9, the thermo-insulated compound profile 13 thereupon leaving the production device on the transport means 6 in the direction of movement of the latter.

While the first metal profile 8 runs through the four various stations of the production head 1, the transport means 6 constantly feeds in further metal profiles 8 so that finally four compound profiles 13 are always being manufactured simultaneously. In this way a continuous production sequence is achieved.

Figure 2:
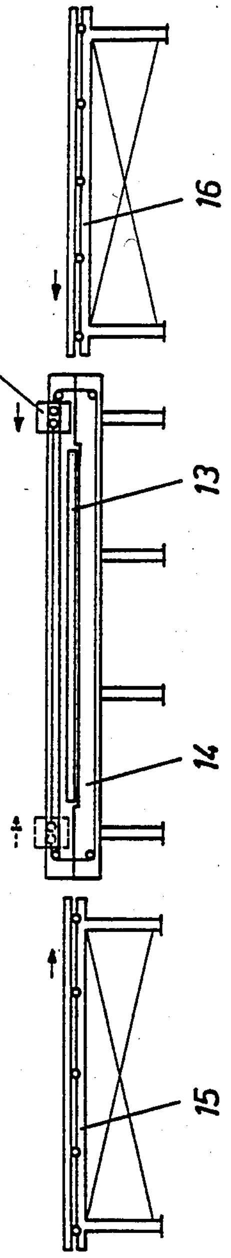
FIG. 2 shows a side view of an installation constructed according to the production principle following from FIG. 1.
Figure 3:
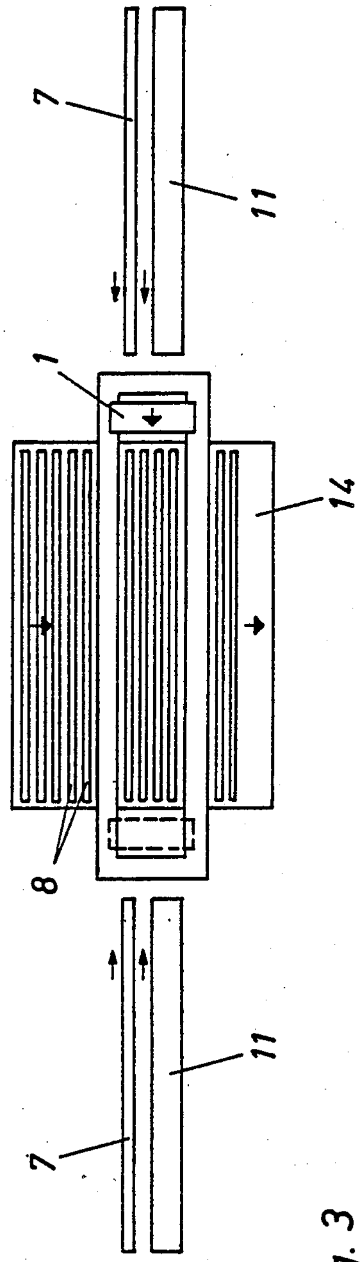
FIG. 3 shows a plan view of the installation in FIG. 2.

An installation equipped with the production head 1 explained with reference to FIG. 1 follows from FIGS. 2 and 3. In this installation, the production head 1 above a production table 14 can be moved in the longitudinal direction of the compound profiles 13 being worked on the production table 14. At the ends of its track are arranged feed devices 15 and 16 for the connecting webs 7 and metal profiles 11 to be drawn into or slipped onto the metal profiles 8 by the production head 1 alternately from the feed device 15 or the feed device 16.

Figure 4:
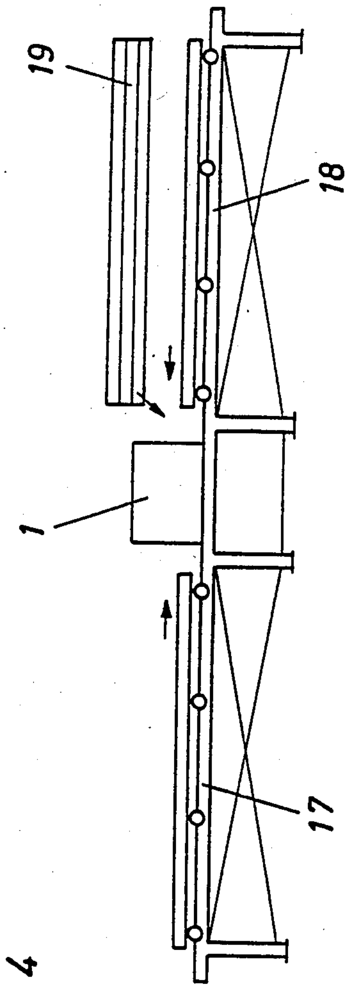
FIG. 4 shows the side view of a production device of a different design to that of the production device in FIGS. 2 and 3.
Figure 5:
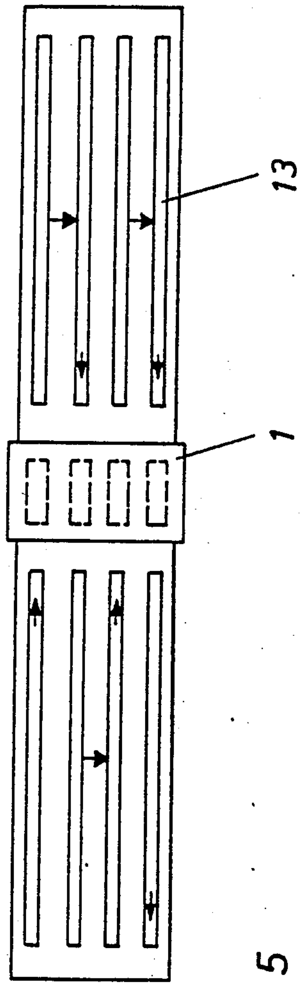
FIG. 5 shows a plan view of the installation in FIG. 4.

In contrast to the previously described installation, the production device of the production head 1 which can be seen in FIGS. 4 and 5 is not movably attached but stationary between two longitudinal conveyors 17 and 18. By means of these two longitudinal conveyors 17 and 18, the compound profiles 13 located in production, in accordance with the arrows shown in FIG. 5, are moved through under the production head 1 alternately in both directions and in each case moved sideways by one production stage corresponding to the process steps, with the connecting webs 7 and metal profiles 11 to be drawn in or slipped on being fed from a feed magazine 19 allocated to a longitudinal conveyor 18. The advantage of an installation designed in this way is that, in its longitudinal extension, as compared with the design shown in FIGS. 2 and 3, it only needs to be twice the length of the compound profiles 13 instead of three times the length; this leads to very considerable space saving.

It would of course also be possible, in a different way to the previously described installations, to arrange the individual production stations of the production head 1 to be separate from one another, and to have the profiles to be produced run through these stations one after the other, although this would result in a greater spatial expansion of the installation. However, the production area could in turn be reduced if the device which is used to slip on lid-like the second metal profile 11 is also used to deform the retaining strips 12 outside the insulating chamber 9.

I claim:

1. A device for manufacturing thermo-insulated compound profiles for windows, doors and facades, comprising: a production head; a double clamp in said production head for drawing in connecting webs; at least one forming roller projecting into an insulating chamber area of a compound profile and pressing against inner retaining strips of a first metal profile provided with connecting webs; a gripping clamp for slipping on a second metal profile and forming rollers located opposite one another in pairs at right angles to a profile access and acting from outside on said retaining strips to be pressed last; said double clamp, said one forming roller, and said gripping clamp being arranged next to one another in said production head in a predetermined sequence.

2. Device as claimed in claim 1, wherein the production head can be moved above a production table in the longitudinal direction of the compound profiles being worked on the production table.

3. Device as claimed in claim 2, wherein the compound profiles being worked on simultaneously lie on a transport means moving cyclically after every process step in a transverse direction to the direction of travel of the production head.

4. Device as claimed in claim 2, wherein feed devices for the connecting webs and metal profiles to be drawn in or slipped on by the production head are provided at the ends of the track of the production head.

5. Device as claimed in claim 1, wherein the compound profiles being worked on simultaneously are moved by means of longitudinal conveyors through under the production head alternately in both directions and in each case moved sideways by one production stage corresponding to the process steps, with the connecting webs and the metal profiles to be drawn in or slipped on by the production head being fed from a feed magazine allocated to the longitudinal conveyors.

* * * * *